United States Patent
Akiyama et al.

(10) Patent No.: US 6,972,923 B2
(45) Date of Patent: Dec. 6, 2005

(54) MAGNETIC RECORDING MEDIUM AND MAGNETIC RECORDING/REPRODUCING APPARATUS USING THE SAME

(75) Inventors: Junichi Akiyama, Kawasaki (JP); Akira Kikitsu, Yokohama (JP); Tadashi Kai, Kawasaki (JP); Toshihiko Nagase, Kawasaki (JP); Tomoyuki Maeda, Yokohama (JP); Hisanori Aikawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 215 days.

(21) Appl. No.: 10/396,514

(22) Filed: Mar. 26, 2003

(65) Prior Publication Data

US 2004/0051994 A1    Mar. 18, 2004

(30) Foreign Application Priority Data

Mar. 29, 2002    (JP)    ............................... 2002-094847

(51) Int. Cl.⁷ ............................................. G11B 5/596
(52) U.S. Cl. ................................................... 360/77.07
(58) Field of Search ............................. 360/77.07, 48, 360/77.11, 131, 324; 428/694 TM, 65.3, 428/167, 694 T, 98, 270.13, 64.1, 632, 135

(56) References Cited

U.S. PATENT DOCUMENTS 4,924,334 A * 5/1990 Diepers et al. .......... 360/77.07
5,583,727 A * 12/1996 Parkin ........................ 360/324

FOREIGN PATENT DOCUMENTS

JP    7-201002    8/1995
JP    2001-195702    7/2001

OTHER PUBLICATIONS

U.S. Appl. No. 10/396,514, filed Mar. 26, 2003, Akiyama et al.
U.S. Appl. No. 10/668,231, filed Sep. 24, 2003, Kikitsu et al.

* cited by examiner

Primary Examiner—David Hudspeth
Assistant Examiner—Mitchell Slavitt
(74) Attorney, Agent, or Firm—Oblon, Spivak, McClelland, Maier & Neustadt, P.C.

(57) ABSTRACT

A magnetic recording medium has a substrate, and a servo signal recording magnetic layer whose magnetization is oriented in a direction perpendicular to a surface thereof, a non-magnetic layer and a data recording magnetic layer, which are stacked on the substrate in the order mentioned. The servo signal recording magnetic layer has a coercivity higher than that of the data recording magnetic layer. The servo signal recording magnetic layer has servo tracks formed with a track pitch Tps, the servo tracks adjacent to each other in a track width direction being magnetized to opposite directions perpendicular to the film surface.

15 Claims, 3 Drawing Sheets

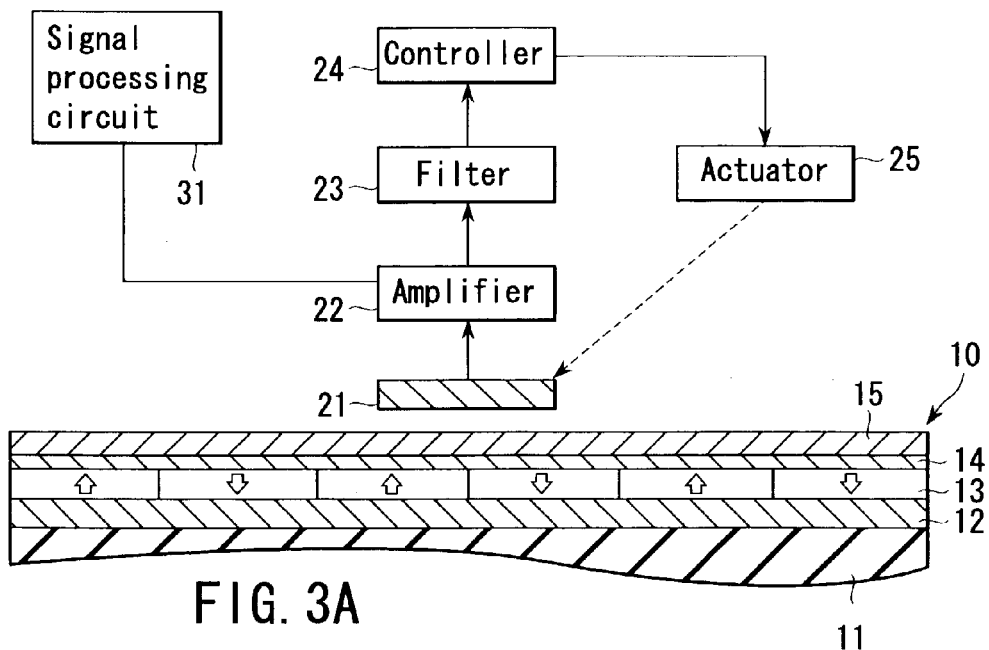
FIG. 3A
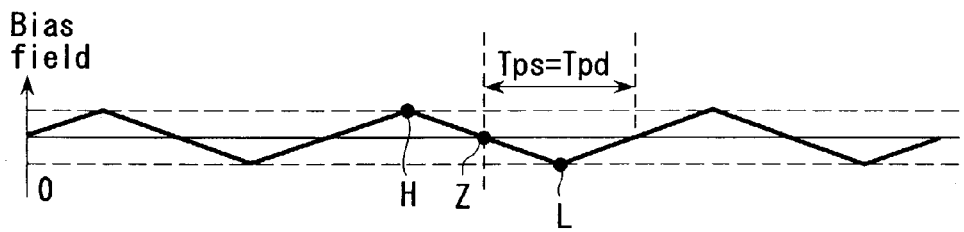
FIG. 3B
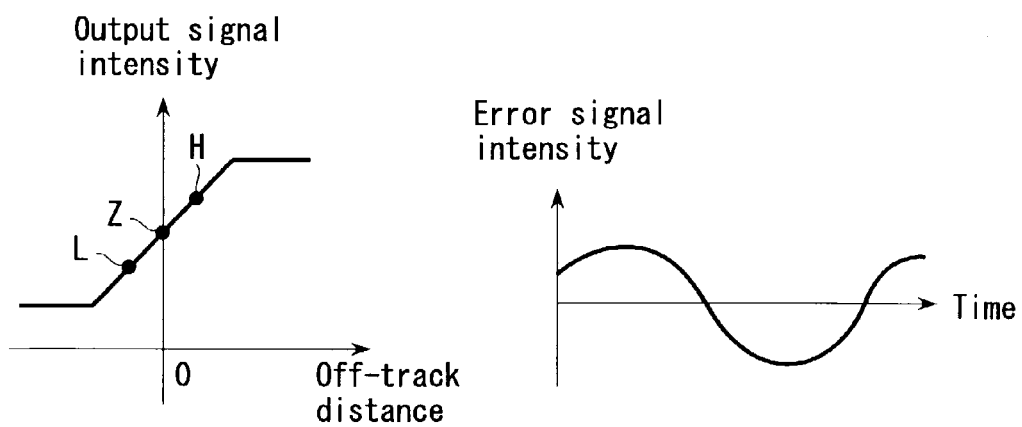
FIG. 4A
FIG. 4B

MAGNETIC RECORDING MEDIUM AND MAGNETIC RECORDING/REPRODUCING APPARATUS USING THE SAME

CROSS-REFERENCE TO RELATED APPLICATIONS

This application is based upon and claims the benefit of priority from the prior Japanese Patent Application No. 2002-94847, filed Mar. 29, 2002, the entire contents of which are incorporated herein by reference.

BACKGROUND OF THE INVENTION

1. Field of the Invention

The present invention relates to a magnetic recording medium having a high track density and enables highly accurate head positioning, and relates to a high-capacity and inexpensive magnetic recording/reproducing apparatus using the magnetic recording medium and having high format efficiency.

2. Description of the Related Art

In recent years, areal recording densities of hard disk drives keep increasing with an annual percentage rate of about 100%. Since the recording track density is also increased as the recording density continues to increase, highly accurate head positioning will be required more than ever. Accordingly, a frequency bandwidth of positioning servo signals must be improved. As long as a conventional sample servo system is used, the number of sectors to be provided in a magnetic disk must be increased with increase in the recording density. However, increase in the number of sectors lowers format efficiency, which disturbs high capacity.

As a solution, there has been studied to adopt a continuous servo system, which makes it possible to obtain tracking servo signals (positioning error signals) wherever the magnetic head is placed over the disk. However, low-cost and effective means that enables continuous positioning servo for the magnetic head has not yet proposed, and thus a novel technique has been demanded. Under the circumstances, there has been demanded a novel magnetic recording medium that can realize highly accurate positioning of the magnetic head without changing a structure and function of the conventional magnetic head, and a novel magnetic recording/reproducing apparatus including a continuous positioning means for the magnetic head to which the continuous servo technique is applied.

As described above, in order to keep improving the recording density and the capacity of the magnetic disk drive in the future, highly accurate head positioning must be enabled by adopting the continuous servo technique for the magnetic head.

BRIEF SUMMARY OF THE INVENTION

It is an object of the present invention to provide a magnetic recording medium which enables continuous positioning, i.e., tracking of a magnetic head even if an existing magnetic head is used, and to provide a high-capacity, high-speed and inexpensive magnetic recording/reproducing apparatus which enables continuous servo by using the magnetic recording medium.

According to an aspect of the present invention, there is provided a magnetic recording medium comprising: a substrate; and a servo signal recording magnetic layer whose magnetization is oriented in a direction perpendicular to a surface thereof, a non-magnetic layer and a data recording magnetic layer, which are stacked on the substrate in the order mentioned or in the reverse order, the servo signal recording magnetic layer having a coercivity higher than that of the data recording magnetic layer, and the servo signal recording magnetic layer having servo tracks formed with a track pitch Tps, the servo tracks adjacent to each other in a track width direction being magnetized to opposite directions, both perpendicular to the film surface.

According to another aspect of the present invention, there is provided a magnetic recording/reproducing apparatus comprising: a magnetic recording medium comprising a substrate, and a servo signal recording magnetic layer whose magnetization is oriented in a direction perpendicular to a surface thereof, a non-magnetic layer and a data recording magnetic layer, which are stacked on the substrate in the order mentioned or in the reverse order, the servo signal recording magnetic layer having a coercivity higher than that of the data recording magnetic layer, and the servo signal recording magnetic layer having servo tracks formed with a track pitch Tps, the servo tracks adjacent to each other in a track width direction being magnetized to opposite directions, both perpendicular to the film surface; a magnetic head including a magnetic reproducing element and a magnetic recording element; an actuator actuating the magnetic head over the magnetic recording medium; an amplifier amplifying output signals from the magnetic reproducing element; a low-pass filter having a cutoff frequency lower than a minimum frequency of data recording signals recorded in the data recording magnetic layer and filtering low-frequency signals from the signals amplified by the amplifier; and a controller controlling the actuator based on the low-frequency signals from the low-pass filter.

BRIEF DESCRIPTION OF THE SEVERAL VIEWS OF THE DRAWING

FIG. 3A is a diagram showing a magnetic recording/reproducing apparatus according to an embodiment of the present invention, and FIG. 3B is a graph showing change in bias magnetic field along a track direction;

FIG. 4A is a graph showing a relationship between output signal intensity and an off-track distance, and FIG. 4B is a graph showing change in error signal intensity;

DETAILED DESCRIPTION OF THE INVENTION

The structure and the principle of operation of a magnetic recording medium and a magnetic recording/reproducing apparatus according to an embodiment of the present invention will now be described with reference to FIGS. 1, 2, 3A, 3B, 4A and 4B.

Figure 1:
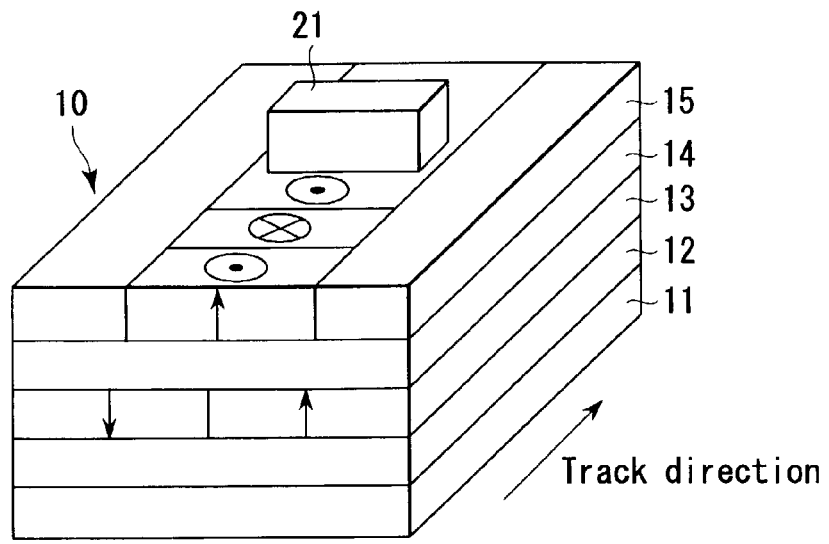
FIG. 1 is a perspective view showing a magnetic recording medium according to an embodiment of the present invention.

FIG. 1 is a perspective view showing a magnetic recording medium 10 according to an embodiment of the present invention. As shown in FIG. 1, the magnetic recording medium 10 has a structure that, on the non-magnetic substrate 11, the soft magnetic underlayer 12, the servo signal recording magnetic layer 13 whose magnetization is oriented in a direction perpendicular to the film surface, the non-magnetic layer 14 and the data recording magnetic layer 15 are stacked in the order mentioned. A protective layer (not shown in FIG. 1) formed of, for example, carbon is formed on the data recording magnetic layer 15 and a liquid lubricant layer (not shown in FIG. 1) formed of, for example, Fomblin is further applied to the protective layer. In FIG. 1, a perpendicular magnetic layer is used as the data recording magnetic layer 15. However, a longitudinal magnetic layer may be used as the data recording magnetic layer 15. It should be noted that the stacking order of the servo signal recording magnetic layer 13, the non-magnetic layer and the data recording magnetic layer 15 may be reversed.

The coercivity of the servo signal recording magnetic layer 13 is set sufficiently higher than that of the data recording magnetic layer 15 such that the servo signal recording magnetic layer 13 is not affected at all when a magnetic head performs writing data signals in the data recording magnetic layer 15. The servo signal recording magnetic layer 13 has servo tracks formed with a track pitch Tps, where the servo tracks adjacent to each other in the track width direction are magnetized to opposite directions, both perpendicular to the film surface. These servo tracks are used for positioning, i.e., tracking of the magnetic head as will be described later in detail. Such servo tracks can be formed with the equal track pitch Tps in advance by DC erasing using ordinary perpendicular magnetic recording, thermally-assisted magnetic recording or magnetic print method in such a manner that the adjacent tracks are magnetized with the opposite polarities in the directions perpendicular to the film surface.

Figure 2:
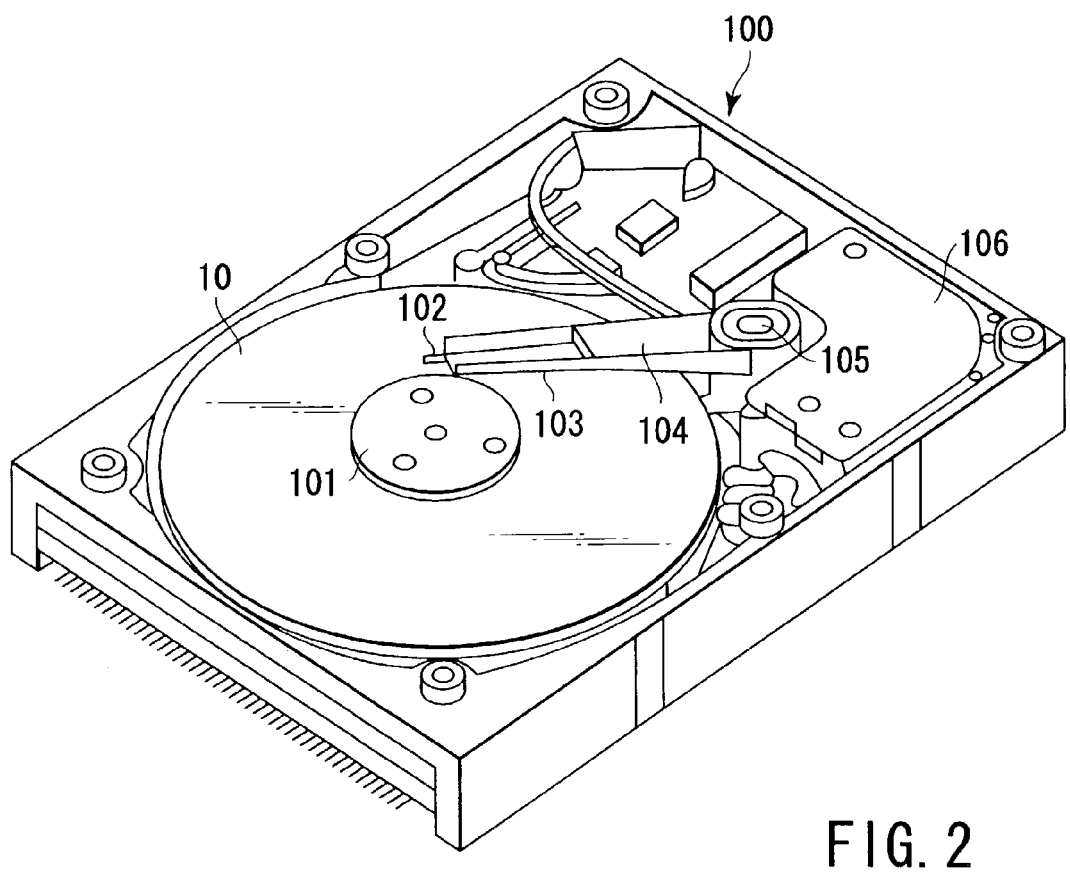
FIG. 2 is a perspective view showing a magnetic recording/reproducing apparatus according to an embodiment of the present invention.

FIG. 2 is a perspective view schematically showing a structure of a magnetic recording/reproducing apparatus according to an embodiment of the present invention. The magnetic recording/reproducing apparatus 100 is of a type using a rotary actuator. In the drawing, the magnetic disk 10 is attached to the spindle 101 and is rotated in response to signals from a drive controller (not shown). The magnetic recording/reproducing apparatus 100 may include a plurality of magnetic disks.

The head slider 102 that performs recording and reproduction of information stored in the disk 10 is mounted on the end of the suspension 103. The head slider 102 is provided with a magnetic reproducing element (read head) and a magnetic recording element (write head) in the vicinity of the end thereof. When the medium disk 10 is rotated, the air-bearing surface (ABS) of the head slider 102 are held with a predetermined flying height from the surface of the medium disk 10. Note that a head slider of a so-called contact-type that is in contact with the disk 10 may be adopted.

The suspension 103 is connected with one end of the actuator arm 104 having a bobbin section that holds a driving coil on the other end (not shown). The voice coil motor 106, a type of a linear motor, is provided as an actuator at the other end of the actuator arm 104. The voice coil motor 106 is constituted by a magnetic circuit including a driving coil (not shown) wound around the bobbin section of the actuator arm 105, a permanent magnet and a yoke arranged so as to sandwich the coil. The actuator 104 is supported by ball bearings provided at two positions along the pivot 105, and can be pivoted freely by the voice coil motor 106.

FIG. 3A shows a diagram of a tracking loop of the magnetic recording/reproducing apparatus according to an embodiment of the present invention. The magnetic recording medium 10 of FIG. 3A is the same as one illustrated in FIG. 1, and FIG. 3A shows a cross section of the magnetic recording medium along the track width direction. As shown in FIGS. 3A and 1, when recording or reproduction is performed, the magnetic head including a magnetic reproducing element 21 and a magnetic recording element (not shown) is opposed to the magnetic recording medium 10 and caused to be moved relatively while being floated from or in contact with the magnetic recording medium 10.

The positional relationship between the servo tracks of the servo signal recording magnetic layer 13 and the data recording tracks recorded in the data recording magnetic layer 15 will now be described with reference to FIG. 1. In this case, the track pitch Tps of the servo track is equal to the track pitch Tpd of the data recording track, and the data recording track is deviated from the servo track by a half pitch in the track width direction. Thus, the tracks are formed in such a manner that the center of the data recording track is positioned over the boundary between the two adjacent servo tracks.

The width of the magnetic reproducing element 21 is made narrower than the data recording track width. It should be noted that there is no need to employ a novel magnetic reproducing element having a novel structure and an existing magnetic reproducing element using a giant magnetoresistive element (GMR element) or a tunneling magnetoresistive element (TMR element) can be employed as it is.

FIG. 3A shows, as constituent elements of the magnetic recording/reproducing apparatus, the actuator 25 (for example, a voice coil motor) actuating the magnetic head over the magnetic recording medium, the amplifier 22 amplifying output signals from the magnetic reproducing element 21, the low-pass filter 23 having a cutoff frequency lower than the minimum frequency of data recording signals recorded in the data recording magnetic layer 15 and filtering low-frequency signals from the signals amplified by the amplifier 22, and the controller 24 controlling the actuator 25 based on the low-frequency signals from the low-pass filter 23. Further, information recorded in the data recording magnetic layer 15 is supplied from the amplifier 22 to the signal processing circuit 31 and reproduced.

Referring to FIGS. 3A and 3B, the relationship between the position (in the track width direction) of the sensitivity center of the active area of the magnetic reproducing element 21 relative to the servo track and the bias magnetic field intensity that the magnetic reproducing element 21 receives from the servo signal recording magnetic layer 13 will now be discussed. Specifically, as shown in FIG. 3A, following case are considered: the case where the sensitivity center of the active area of the magnetic reproducing element 21 is placed over the boundary between the two adjacent servo tracks (corresponding to Z in FIG. 3B), the case where the sensitivity center is subjected to off-track in the left direction in FIG. 3A from the boundary (corresponding to H in FIG. 3B), and the case where the sensitivity center is subjected to off-track in the right direction in FIG. 3A from the boundary (corresponding to L in FIG. 3B).

In case of Z, since magnetic fluxes which have opposite polarities and are equal in amount flow into the magnetic reproducing element 21 from the two servo tracks which have been subjected to DC erasing in the perpendicular direction with the opposite polarities, the bias magnetic field acting on the magnetic reproducing element 21 is zero on average, namely, the magnetic reproducing element 21 is in the zero bias state.

In case of H, since many magnetic fluxes flow into the magnetic reproducing element 21 from the servo track that the magnetization is oriented upward rather than from the servo track that the magnetization is oriented downward, the bias magnetic field acting on the magnetic reproducing element 21 becomes high.

In case of L, since many magnetic fluxes flow into the magnetic reproducing element 21 from the servo track that the magnetization is oriented downward rather than from the servo track that the magnetization is oriented upward, the bias magnetic field acting on the magnetic reproducing element 21 becomes low.

As described above, it can be understood that the bias state caused due to magnetization of the servo tracks varies when the magnetic reproducing element 21 is subjected to off-track.

FIG. 4A schematically shows a relationship between the off-track distance and output signal intensity when the magnetic reproducing element 21 moves over the data recording track. Furthermore, FIG. 4B schematically shows change in error signal intensity obtained from the magnetic reproducing element 21 when the magnetic reproducing element 21 is subjected to off-track over the magnetic recording medium.

In this manner, the output signals from the magnetic reproducing element 21 are fluctuated because of the off-track of the element. Generally, the frequency of the error signals based on off-track (distance) is sufficiently lower than the minimum frequency of the data signals.

Therefore, if the output signals from the magnetic reproducing element 21 are amplified by the amplifier 22 in a dc manner and then the amplified signals are caused to pass through the low-pass filter 23 having a cutoff frequency sufficiently lower than the minimum frequency of the data signals, signals proportional to off-track can be filtered. Since the signals are in proportion to a positioning error of the magnetic head, control of the actuator 25 for the magnetic head by means of the controller 24 in such a manner that the signals constantly become zero enables highly accurate head positioning (continuous servo). Using this technique enables magnetic recording/reproduction of data even with a high track pitch of several hundreds of kTPI exceeding 100 kTPI.

According to the present invention, the following effects and advantages can be obtained. (1) Since tracking is performed in the continuous servo system, the servo bandwidth is greatly improved as compared with the prior art sample servo system, resulting in improved tracking accuracy, which makes it possible to improve the track density and the areal recording density. (2) Since tracking in the continuous servo system eliminates recording of tracking signals in the data recording magnetic layer, a high capacity can be realized without sacrificing format efficiency. (3) Since servo write required in assembling the magnetic disk drive in the prior art is no longer necessary, the production cost can be greatly reduced. (4) The above advantages can be obtained with the existing magnetic head, and there is no need to develop a magnetic head with a novel structure.

The above description has been given as to the case where the track pitch Tpd of the data recording tracks recorded in the data recording magnetic layer is equal to the track pitch Tps of the servo tracks. However, in principle, Tps may be 1/n (n is a natural number not less than 1) of Tpd, and Tps may be set to ½ or ⅓ of Tpd, for example.

Figure 5:
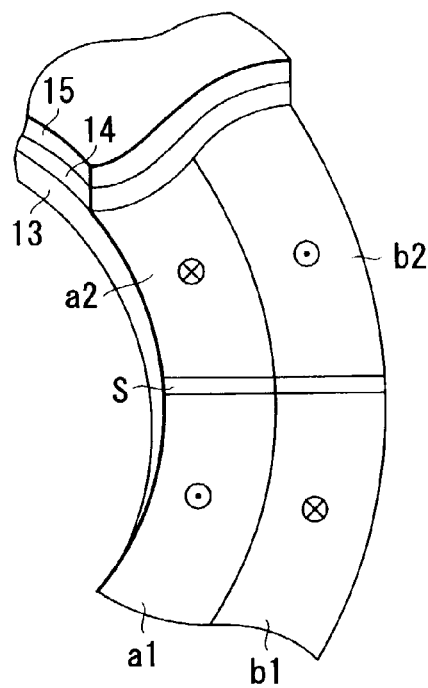
FIG. 5 is a schematic view showing magnetization states of a servo signal magnetic layer included in a magnetic recording medium according to another embodiment of the present invention.

The servo tracks may be magnetized in the same direction (upward or downward direction) within the full circle of the disk. On the other hand, as shown in FIG. 5 (only two servo tracks are illustrated in the drawing), a servo track may be divided into a plurality of areas within the full circle of the disk and the areas (for example, a1 and a2) adjacent to each other in the track direction of the servo track may be magnetized to opposite directions perpendicular to the film surface. In this case, the length of one area divided within the full circle of the track is set longer than the length of one sector in the recording track. In this manner, a magnetization transition between the servo tracks is prevented from being arranged in the sector of the recording track. In case of FIG. 5, the servo tracks (for example, a1 and b1) adjacent to each other in the track width direction are magnetized to opposite directions perpendicular to the film surface.

Control signals for the magnetic head may be recorded in the servo signal recording magnetic layer 13 or the data recording magnetic layer 15 of the magnetic recording medium 10. For example, in the servo tracks shown in FIG. 5, sector information may be recorded in areas s between two areas (for example, a1 and a2) adjacent to each other along the track direction, and the magnetic head may be controlled based on the sector information.

Materials used for the respective layers in the magnetic recording medium according to the embodiments of the present invention will now be described.

Figure 6:
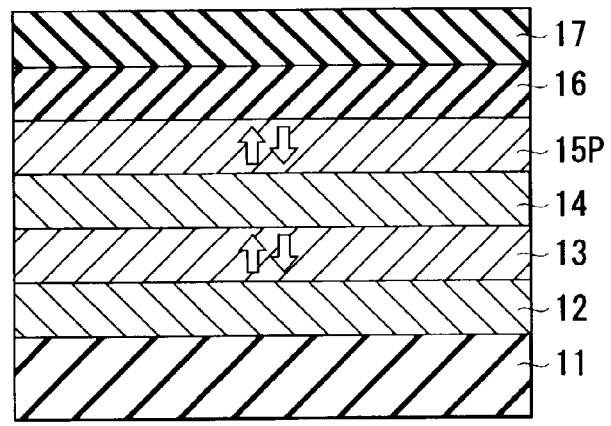
FIG. 6 is a cross-sectional view of a magnetic recording medium according to still another embodiment of the present invention.

The magnetic recording medium shown in FIG. 6 has the same stacked structure as that illustrated in FIG. 1, in which the soft magnetic underlayer 12, the servo signal recording magnetic layer 13 whose magnetization is oriented in the direction perpendicular to the film surface, the non-magnetic layer 14, the data recording magnetic layer 15 whose magnetization is oriented in the direction perpendicular to the film surface and the protective layer 16 are formed on the non-magnetic substrate 11 such as glass. Further, the lubricant layer 17 is applied to the protective layer 16. The drawing does not show servo tracks and data recording tracks.

A material for the soft magnetic underlayer 12 includes FeTaN, FeTaC, FeCo, FeSi, and CoZrNb.

A material for the servo signal recording magnetic layer 13, whose magnetization is oriented in the direction perpendicular to the film surface, includes a FePt-based alloy, a CoCr-based alloy, a CoCrPt-based alloy, or an artificial lattice magnetic layer such as [Co/Pd]n and [Co/Pt]n.

The non-magnetic layer 14 is provided for the purpose of disrupting exchange coupling between the servo signal recording magnetic layer 13 and the data recording magnetic layer 15, and has a thickness so as to prevent the exchange coupling from effecting between these layers. A material for the non-magnetic layer is selected depending on the materials of the servo signal recording magnetic layer 13 and the data recording magnetic layer 15. The material for the non-magnetic layer includes a metal such as Cr, Nb, V, Ta, Ti, W, Hf, Cr, In, Cu, Zr, Pt, Pd, Ru, Re, Rh, Mo, Ag and A, a semiconductor such as Si, Ge and C, and a dielectric material such as Si—O, Mg—O, Al—O, Ti—O, Ta—O, Y—O, Zr—O, Si—N, Al—N, Ti—N, Ge—N, Si—C and Ta—C. These materials are employed singly or in a combination of two or more species.

A material for the data recording magnetic layer 15 whose magnetization is oriented in the direction perpendicular to the film surface includes a FePt-based alloy, a CoCr-based alloy, a CoCrPt-based alloy, and an artificial lattice magnetic layer such as [Co/Pd]n and [Co/Pt]n.

A material for the protective layer 16 includes, for example, carbon, and a material for the lubricant layer 17 includes, for example, a Fomblin-based material.

An underlayer may be provided between the non-magnetic substrate 11 and the soft magnetic underlayer 12 and/or between the soft magnetic underlayer 12 and the servo signal recording magnetic layer 13 in order to improve characteristics of each magnetic layer.

Incidentally, the soft magnetic underlayer 12 is provided between the non-magnetic substrate 11 and the servo signal recording magnetic layer 13, but the soft magnetic underlayer 12 may be eliminated where no trouble is brought about.

Figure 7:
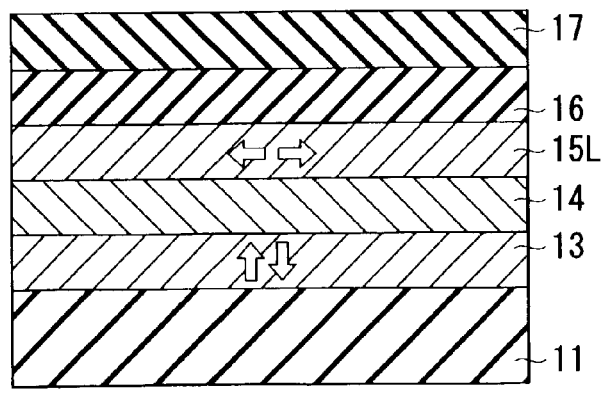
FIG. 7 is a cross-sectional view of a magnetic recording medium according to yet another embodiment of the present invention.

In the magnetic recording medium of FIG. 7, on a non-magnetic substrate 11 formed of, e.g., glass, a servo signal recording magnetic layer 13 whose magnetization is oriented in the direction perpendicular to the film surface, a non-magnetic layer 14, a data recording magnetic layer 15L whose magnetization is oriented in the direction parallel to the film surface, and a protective layer 16 are formed, and a lubricant layer 17 is further applied to the protective layer 16.

The magnetic recording medium of FIG. 7 has the same structure as that depicted in FIG. 6 except that a longitudinal magnetic layer is used as the data recording magnetic layer 15L.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A magnetic recording medium comprising:
   a substrate; and
   a servo signal recording magnetic layer whose magnetization is oriented in a direction perpendicular to a film surface, a non-magnetic layer and a data recording magnetic layer, which are stacked on the substrate in the order mentioned or in the reverse order,
   wherein the servo signal recording magnetic layer has a coercivity higher than that of the data recording magnetic layer, the servo signal recording magnetic layer has servo tracks formed with a track pitch Tps, and the servo tracks adjacent to each other in a track width direction are magnetized to opposite directions perpendicular to the film surface, and
   wherein a soft magnetic underlayer is formed on the substrate, and the servo signal recording magnetic layer, the non-magnetic layer and the data recording magnetic layer are stacked on the soft magnetic underlayer in the order mentioned or in the reverse order.

2. A magnetic recording medium comprising:
   a substrate; and
   a servo signal recording magnetic layer whose magnetization is oriented in a direction perpendicular to a film surface, a non-magnetic layer and a data recording magnetic layer, which are stacked on the substrate in the order mentioned or in the reverse order,
   wherein the servo signal recording magnetic layer has a coercivity higher than that of the data recording magnetic layer, the servo signal recording magnetic layer has servo tracks formed with a track pitch Tps, and the servo tracks adjacent to each other in a track width direction are magnetized to opposite directions perpendicular to the film surface, and
   wherein the data recording magnetic layer has data recording tracks formed with a track pitch Tpd which is equal to the track pitch Tps of the servo tracks, each data recording track being deviated from each servo track by a half pitch in the track width direction.

3. A magnetic recording medium comprising:
   a substrate; and
   a servo signal recording magnetic layer whose magnetization is oriented in a direction perpendicular to a film surface, a non-magnetic layer and a data recording magnetic layer, which are stacked on the substrate in the order mentioned or in the reverse order,
   wherein the servo signal recording magnetic layer has a coercivity higher than that of the data recording magnetic layer, the servo signal recording magnetic layer has servo tracks formed with a track pitch Tps, and the servo tracks adjacent to each other in a track width direction are magnetized to opposite directions perpendicular to the film surface, and
   wherein the servo track is magnetized in a same direction perpendicular to the film surface within a full circle.

4. A magnetic recording medium comprising:
   a substrate; and
   a servo signal recording magnetic layer whose magnetization is oriented in a direction perpendicular to a film surface, a non-magnetic layer and a data recording magnetic layer, which are stacked on the substrate in the order mentioned or in the reverse order,
   wherein the servo signal recording magnetic layer has a coercivity higher than that of the data recording magnetic layer, the servo signal recording magnetic layer has servo tracks formed with a track pitch Tps, and the servo tracks adjacent to each other in a track width direction are magnetized to opposite directions perpendicular to the film surface, and
   wherein the servo track is divided into a plurality of areas within a full circle, and the areas of the servo track adjacent to each other in the track direction are magnetized to opposite directions perpendicular to the film surface.

5. The magnetic recording medium according to claim 4, wherein a length of one area divided for the full circle of the servo track is longer than a length of one sector in the recording track.

6. A magnetic recording/reproducing apparatus comprising:
   a magnetic recording medium comprising a substrate, and a servo signal recording magnetic layer whose magnetization is oriented in a direction perpendicular to a surface thereof, a non-magnetic layer and a data recording magnetic layer, which are stacked on the substrate in the order mentioned or in the reverse order, the servo signal recording magnetic layer having a coercivity higher than that of the data recording magnetic layer, and the servo signal recording magnetic layer having servo tracks formed with a track pitch Tps, the servo tracks adjacent to each other in a track width direction being magnetized to opposite directions perpendicular to the film surface;
   a magnetic head including a magnetic reproducing element and a magnetic recording element;
   an actuator actuating the magnetic head over the magnetic recording medium;

an amplifier amplifying output signals from the magnetic reproducing element;

a low-pass filter having a cutoff frequency lower than a minimum frequency of data recording signals recorded in the data recording magnetic layer and filtering low-frequency signals from the signals amplified by the amplifier; and a controller controlling the actuator based on the low-frequency signals from the low-pass filter.

7. The apparatus according to claim 6, wherein a soft magnetic underlayer is formed on the substrate of the magnetic recording medium, and the servo signal recording magnetic layer, the non-magnetic layer and the data recording magnetic layer are stacked on the soft magnetic underlayer in the order mentioned or in the reverse order.

8. The apparatus according to claim 6, wherein control signal for the magnetic head are recorded in the servo signal recording magnetic layer or the data recording magnetic layer of the magnetic recording medium.

9. The apparatus according to claim 6, wherein the data recording magnetic layer has data recording tracks formed with a track pitch Tpd which is equal to the track pitch Tps of the servo tracks, each data recording track being deviated from each servo track by a half pitch in the track width direction.

10. The apparatus according to claim 9, wherein a width of the magnetic reproducing element is narrower than a width of the data recording track.

11. The apparatus according to claim 6, wherein the servo track is magnetized in a same direction perpendicular to the film surface within a full circle.

12. The apparatus according to claim 6, wherein the servo track is divided into a plurality of areas within a full circle, and the areas of the servo track adjacent to each other in a track direction are magnetized to opposite directions perpendicular to the film surface.

13. The apparatus according to claim 12, wherein a length of the area divided within the full circle of the servo track is longer than a length of a sector in the recording track.

14. The apparatus according to claim 6, wherein the data recording magnetic layer is a perpendicular magnetic recording layer.

15. The apparatus according to claim 6, wherein the data recording magnetic layer is a longitudinal magnetic recording layer.

* * * * *